United States Patent
Fagerås et al.

(10) Patent No.: US 6,775,203 B2
(45) Date of Patent: Aug. 10, 2004

(54) SEISMIC SEABED CABLE WITH SENSOR UNITS

(75) Inventors: Bjarte Fagerås, Fana (NO); Magne Oldervoll, Os (NO)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 10/198,534

(22) Filed: Jul. 18, 2002

(65) Prior Publication Data

US 2004/0013036 A1 Jan. 22, 2004

(51) Int. Cl.⁷ .................... G01V 1/40; G08C 15/00
(52) U.S. Cl. ..................... 367/16; 367/4; 367/177
(58) Field of Search ................ 367/4, 16, 177; 181/112, 400, 110

(56) References Cited

U.S. PATENT DOCUMENTS

| | | | |
|---|---|---|---|
| 3,350,678 A | | 10/1967 | McLoad |
| 3,425,506 A | * | 2/1969 | Evans ................. 367/16 |
| 3,921,755 A | * | 11/1975 | Thigpen ............... 181/122 |
| 3,930,219 A | * | 12/1975 | Kostelwich ........... 367/177 |
| 4,477,887 A | * | 10/1984 | Berni ................. 367/20 |
| 4,628,851 A | | 12/1986 | Appling |
| 3,287,691 A | * | 11/1996 | Sauit ................. 367/16 |
| 5,747,754 A | | 5/1998 | Svenning et al. |
| 5,943,293 A | * | 8/1999 | Luscombe et al. ..... 367/20 |
| 2001/0035311 A1 | | 11/2001 | He et al. |

FOREIGN PATENT DOCUMENTS

| | | |
|---|---|---|
| GB | 1385971 | 3/1975 |
| WO | WO/29874 | 4/2000 |

* cited by examiner

Primary Examiner—Nelson Moskowitz
(74) Attorney, Agent, or Firm—Madan, Mossman & Sriram, P.C.

(57) ABSTRACT

A preferred seismic survey system includes a cable having a sensor unit. The sensor unit includes sensors for detecting acoustical energy (e.g., shear and/or pressure waves) and is disposed in a decoupling device that substantially acoustically uncouples the sensor unit from the cable. One preferred decoupling device includes relatively flexible tension members that isolate the sensor unit from acoustical-energy related movement of the cable. A fastening member, which is optionally formed of vibration absorbing material, affixes the sensor unit to the flexible member. Optionally, a spacer adjusts the resonant frequency of the tension member and a resilient tube encloses the decoupling device. One preferred seismic survey method includes connecting the sensor unit to a cable with a decoupling device that substantially acoustically uncouples the sensor unit from the cable; and positioning a sensor unit on a seabed such that the sensor unit is acoustically coupled to the seabed.

44 Claims, 3 Drawing Sheets

SEISMIC SEABED CABLE WITH SENSOR UNITS

CROSS-REFERENCE TO RELATED APPLICATIONS

None.

BACKGROUND OF THE INVENTION

1. Field of the Invention

The present invention relates to marine cables with sensor units for detection of reflected acoustical energy.

2. Description of the Related Art

Conventional seismic surveys are conducted by a vessel towing an acoustic source close to a water surface. This source emits acoustical energy, typically in the form of pressure waves (p-waves), that penetrates a geological formation of interest below a seabed or mud line ("subsurface formation"). Some of the emitted energy is reflected when the pressure waves pass through the boundaries between the different layers in the ground. A network of sensors (e.g., hydrophones) mounted in one or more cables registers reflected acoustical energy in the form of p-waves. These cables are typically towed in conjunction with or separately from the acoustic source. Conventionally, the hydrophones are pressure sensitive electrical sensors that generate electrical signals corresponding to the detected acoustical energy.

Parts of the energy in the emitted p-waves are reflected as shear waves (s-waves). By registration of the s-waves one can get additional information about the subsurface formation. S-waves propagate only through solids, not liquids. Therefore, the sensors configured to detect s-waves are ideally placed at the seabed to record this type of signals. This is known technology, and the method is amongst other described in U.S. Pat. No. 4,725,990. The sensors that are used have to be motion sensitive (e.g., geophones or accelerometers).

The sensor units' acoustic coupling to the seabed is a critical factor for measuring s-waves. Most known solutions are based on the sensor units' gravity to acoustically couple the sensor unit to the ground. By acoustically couple, it is meant that s-waves (or other forms of acoustically energy) are transferred to the sensor unit from an adjacent body (e.g., seabed). Several solutions have been proposed to optimize the acoustic coupling, amongst other U.S. Pat. No. 5,275,066 where it is claimed that the sensor unit has to be heavy. However, it is believed that a heavy sensor unit will have limitations in the frequency band that can be recorded. A heavy sensor typically acts as a filter for the high frequencies because the shear forces in the seabed will not be large enough to move the sensor at high frequencies. Patent No. 307482 (Norway and WO 00/29874) describes a solution where the sensor unit has to be substantially heavier per unit of length than the cable between them. With relatively thick and heavy cables this will result in a heavy sensor, and it may not be able to record the highest frequencies. According to known theory, the sensor unit should have a specific gravity equal to the specific gravity of the seabed to achieve optimum measurements. Moreover, tests have shown that a sensor with higher specific gravity than the seabed give acceptable results as long as the sensor does not have very high specific gravity. To the inventors' reading, Patent No. 307482 does not appear to explain why the ratio between the weight of the cable and the sensor has to be as described. It is presumed that the intention is to make a system where the vibration in the cable is not transferred to the sensor unit. Other relevant discussions are found in GB 1,385971, 2,202,956 and 2,247,527, U.S. Pat. No. 5,575,187 and WO 97/19846.

To make most advantageous use of reflected shear waves, there is a need for a simple sensor unit that can detect shear waves in an extended range of frequencies.

SUMMARY OF THE INVENTION

The present invention provides devices, systems and methods for enhanced detection of reflected acoustical energy, particularly those in the form of shear waves in a seabed. A preferred system for marine seismic exploration includes a first vessel for deploying a seismic source in a body of water, and a second vessel for deploying a cable adapted to rest on a seabed. One or more sensor units disposed along the cable are configured to detect reflections of the acoustical energy emitted by the source. A preferred sensor unit includes a sensor for detecting shear waves (e.g., a multi-axis accelerometer) and a pressure wave sensor (e.g., hydrophone). The sensor unit includes electronics circuitry for processing and transmitting the signal output of the sensors. Preferably, the cable includes a signal/data transmission carrier to allow the exchange of data between the sensor units and surface equipment. The signal transmission carrier, which can be formed of wires configured to transfer electrical signals, optical signals, and/or power, is preferably coupled to the sensor unit with a subsea connector.

Each sensor is disposed in a decoupling device that substantially acoustically uncoupling the sensor units from the cable. One preferred decoupling device for providing isolation or uncoupling from reflecting acoustical energy in the cable (e.g., shear waves) includes constituent structures that are substantially less rigid than the cable. In one embodiment, the decoupling device includes one or more one flexible tension member having opposing ends connected to the cable. The sensor unit is affixed to the flexible tension member with a fastening member. Optionally, the fastening member is at least partially formed of a vibration absorbing material. Additionally, a spacer can be affixed to the tension member to selectively adjust the resonant frequency of the tension member. Further, a resilient tube can be used to partially or fully enclose the sensor unit and associated equipment.

In another aspect, the present invention provides a method for performing marine seismic surveys. In one preferred embodiment, the method includes disposing a sensor unit in a cable, positioning the sensor unit on a seabed such that the sensor unit is acoustically coupled to the seabed, and connecting the sensor unit to the cable with a decoupling device that substantially acoustically uncouples the sensor unit from the cable. The sensor unit can be configured to detect reflected acoustical energy that are in the form of shear waves and/or pressure waves. Preferably, the method includes substantially isolating the sensor unit from movement in the cable that is associated with acoustical energy. In other embodiments, the method includes transmitting data signals indicative of the detected reflected acoustical energy via at least one data transmission carrier to a surface vessel.

It should be understood that examples of the more important features of the invention have been summarized rather broadly in order that detailed description thereof that follows may be better understood, and in order that the contributions to the art may be appreciated. There are, of course, additional features of the invention that will be described here-

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

Figure 1:
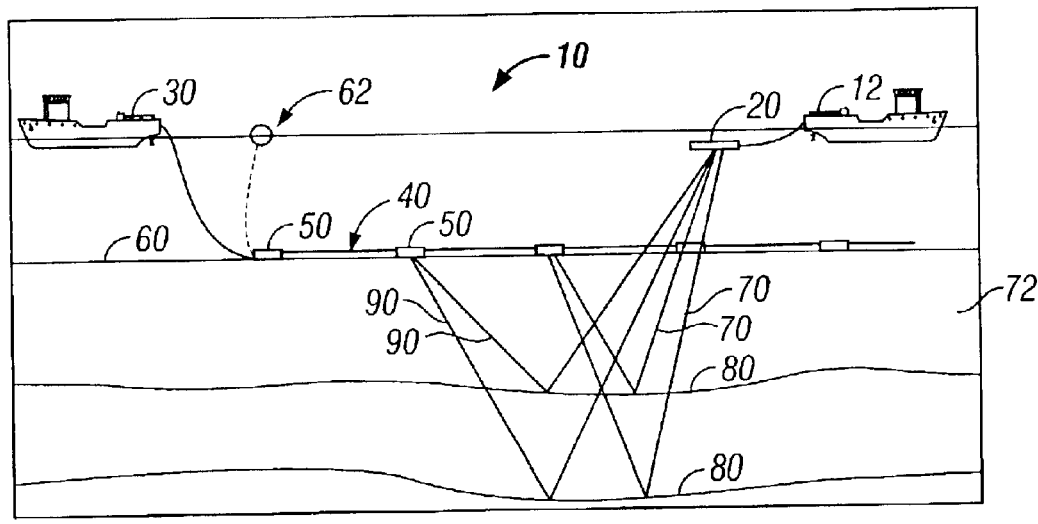
FIG. 1 schematically illustrates a marine seismic survey system arranged according to one embodiment of the present invention.

The present invention relates to apparatus and methods for acoustically uncoupling a sensor unit from adjacent segments of a marine cable to enhance the detection of at least shear waves. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

Referring initially to FIG. 1, there is shown an exemplary embodiment of a marine seismic survey system 10 for recording s-waves. The preferred system 10 includes a first vessel 12 for towing a seismic source 20 such as an air gun array and a second vessel 30 for deploying a cable 40 with sensor units 50 at the seabed 60. Alternatively, the survey can be performed with one vessel. For example, a vessel can deploy the sensor cable 40, which can include tethering or hooking up the sensor cable 40 to a substantially stationary installation 62 (e.g., a buoy or platform) in a pre-selected area. By substantially stationary, it is meant that the movement of the sensor is restricted to a predefined range or perimeter. The buoys and/or platform can be fitted with a suitable data recording system. Thereafter, the same vessel can deploy the seismic source. Thus, in such an alternate arrangement the cable-deployment vessel and the source-towing vessel are the same vessel.

Regardless of the particular arrangement used, the seismic source 20, upon deployment, emits acoustic pulses or pressure waves ("p-waves"), illustrated by line 70, that propagate through the water and the different layers of a subsurface geological formation of interest 72. Some of the energy in the emitted energy 70 is reflected from the boundaries between the different layers in the subsurface formation 80. These boundaries are sometimes referred to as "reflectors" having different acoustic impedances. The reflected acoustical energy will partly be shear waves ("s-waves") and partly p-waves, and are illustrated by line 90. The reflected energy is detected by the sensor units 50, which transmit responsive signals to a recording system (not shown) onboard the vessel 30. These signals are recorded, processed and analyzed by known techniques.

The present invention provides optimal measurements of the reflected energy by acoustically uncoupling the cable 40 from the sensor unit 50. It is preferred that the sensor unit 50 measure s-waves in the immediate vicinity of the sensor unit 50 ("point measurements"). Point measurement is not optimal when the sensor unit 50 is exposed to acoustical energy associated with s-waves present in surrounding elements. For example, the cable 40 between the sensor units 50 will, in most cases, be relatively thick (20–30 mm) and very rigid. Because of its relative rigidity, the cable 40 can pick up reflected acoustical energy such as s-waves hitting the cable 40. The s-waves propagate through the cable 40 and influence an inadequately isolated sensor unit 50. Thus, the measurements are no longer point measurements, but a measurement over a larger area made up by the antenna that the cable 40 represents.

Figure 2:
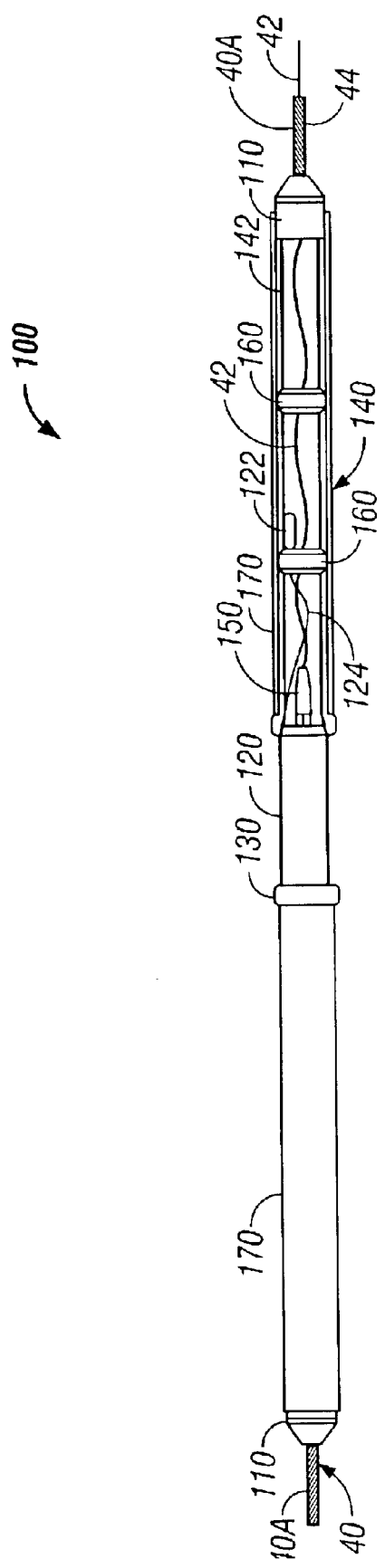
FIG. 2 illustrates a side view of one preferred embodiment of the present invention.

Referring now to FIG. 2, there is shown a preferred sensor module 100 that is mechanically connected to, but substantially acoustically uncoupled from, a cable 40. The preferred sensor module 100 includes a sensor unit 120, a decoupling device 140 and a protective tube 170.

A preferred cable 40 for use with the sensor module 100 is composed of a plurality of axially-aligned segments 40A. Each cable segment 40A connects to an adjacent sensor module 100 and preferably includes data carriers 42 (e.g., electrical and/or fiber optic conductors) and a stress member 44. The stress member 44 can be formed of either steel or synthetic fiber, and formed as a central core within the cable 40 or outside formed as armor sheathing around the cable 40.

A preferred sensor unit 120 includes sensors and electronics for detecting and processing seismic data. A preferred sensor unit 120 includes one or more sensors for detecting reflected acoustical energy such as s-waves and p-waves. Suitable sensors include geophones and motion sensors. Exemplary motions sensors include single or multi-axis accelerometers such as three-component sensors (i.e., three sensors mounted orthogonally to each other). The signals produced by these sensors are processed (e.g., digitized) by electronics circuitry such as known microprocessors (not shown) and transmitted to a recording system (not shown) at the surface. Suitable sensors and sensor systems are disclosed in U.S. application Ser. No. 09/936,629, filed Sep. 12, 2001 and entitled "Accelerometer Transducer Used for Seismic Recording," which is commonly assigned, and which is hereby incorporated by reference for all purposes. The preferred sensor unit 120 also receives data relating to p-waves from an adjacent hydrophone 122.

The decoupling device 140 attaches the sensor unit 120 to the adjacent cable segments 40A via a structure that substantially prevents the transfer of acoustical energy from the cable segments 40A to the sensor unit 120. This structure can be formed of materials and elements that attenuate, absorb, dampen or block such energy transfer. For example, the sensor unit 120 can be molded into polymer (e.g., polyurethane) body having one or more pre-selected characteristics (e.g., weight, buoyancy, flexibility, acoustic transparency). Preferably, the structure is configured to transfer tension between the adjacent cable segments 40A so that the cable 40 can be towed and handled as substantially integral unit. The structure is also configured to isolate the sensor unit 120 from the acoustical energy propagating through the cable 40. This energy can be manifested as motion (e.g., vibration). For example, the structure can include a material that is flexible enough to deform in a manner that vibratory movement in the adjacent cable segment 40A is not transmitted to the sensor unit 120.

An exemplary structure for a preferred decoupling device 140 includes termination blocks 110, tension members 142, and fastening members 130. The termination blocks 110 provide an anchor or attachment point between the sensor module 100 and the cable 40. Preferably, the stress members 44 of adjacent cable segments 40A are fixed to the termination block such that a force applied to the cable segments 40A (e.g., tension) is transferred to the termination block 110. The termination blocks 110 transfer this force to the tension members 142.

The tension members 142 substantially acoustically isolate the sensor unit 120 from the cable 40. In a preferred embodiment, the tension members 142 are affixed to and transfer tension between the termination blocks 110. Further, it is preferred that the tension members 142 be less rigid than the cable 40. An exemplary tension member 142 is configured to have sufficient tensile strength to withstand the tension or traction loading associated with deployment or handling of the cable 40 but is sufficiently flexible to attenuate shear loading. Suitable materials for the tension members 142 include known steel cables and man-made materials such as synthetic fiber rope. While the degree of flexibility (or rigidity) can depend on the particular material and structure of the decoupling device 140, it is preferred that, for example, the tension members 142 be substantially less rigid than the cable 40 to provide a greater degree of acoustic isolation for shear waves in the cable 40. It should be appreciated that the tension members 142 acoustically decouple the sensor module 120 from the cable 40 by substantially limiting the transfer of s-waves from the cable 40 into the sensor module 100. Thus, the weight and rigidity of the cable 40 will not influence the measurements of the sensor module 100. Moreover, it should be appreciated that the weight of the sensor can be determined from the criteria which gives the best acoustic coupling in the required frequency band.

The fastening member 130 provides the connection point between the sensor unit 120 and the tension members 142. In one embodiment, the fastening members 130 are ring-like members or harnesses attached to the sensor unit 120 that have passages (not shown) for receiving the tension members 142. In other embodiments, the fastening members can use hooks, clamps, collars and other known attachment devices. In certain applications, at least one fastening member 130 is substantially fixed to the tension member 142 to restrict axial movement of the sensor module. For enhanced decoupling of the sensor unit 120 from the cable 40, one or more of the fastening members 130 is partially or fully made from a vibration absorbing material (e.g., rubber).

The data carriers 42 include electric wire and/or fiber optic conductors and can be terminated in standard subsea connectors 150. In one embodiment, the data carriers 42 terminate at opposing ends of the sensor unit 120. Thus, signal/data transmission passes through the sensor unit 120. In other embodiments, one or more of the data carriers 42 can pass outside the sensor unit 120. In this alternate arrangement, a portion of the signal/data transmission bypasses the sensor 120 via one or more external data carriers 42 (not shown). Of course, a connection to the sensor module 120 is not required for those external data carriers 42. In certain embodiments, the span of the data carrier 42 between the subsea connector 150 and the termination block 110 can include an insulated cable portion that is coupled to the data carrier 42 in the cable segment 40A via a suitable termination. It should be understood that the data carriers 42 can also be configured to transfer power.

The spacers 160 substantially eliminate resonance frequencies of the tension members 142 in a predetermined seismic band. In a preferred embodiment, the spacers 160 are disk-like members that are interposed between the termination block 110 and the sensor unit 120. The spacer 160 is attached to the tension members 142 such as to effectively reduce the free length of the tension members 142 and thereby increase the resonant frequency. While two spacers 160 are shown, a greater or fewer number may be used to suitably adjust the resonant frequency of the tension members 142. Additionally, the spacers 160 can act as a guard ring to protect the data carrier 42 and surrounding equipment from damage. A preferred hydrophone 122 is mounted in one of the spacers 160 and connected to the sensor unit 120 via a cable 124. Of course, a tension member not formed in a wire may not require a spacer to adjust its resonant frequency.

The protection tube 170 protects the data carrier 42, the stress members 142, and other equipment. Preferably, a protection tube 170 covers or encloses the sections of the sensor module 100 that on opposing sides of the sensor unit 120. For convenience, one of the protection tubes 170 is sectionally shown to reveal the enclosed components. A preferred tube 170 is a resilient flexible sleeve-like member formed at least partially of reinforced rubber hose. In addition to protecting internal parts and equipment, the tube 170 can prevent the stress members 142 from twisting and other undesirable movement.

Figure 3:
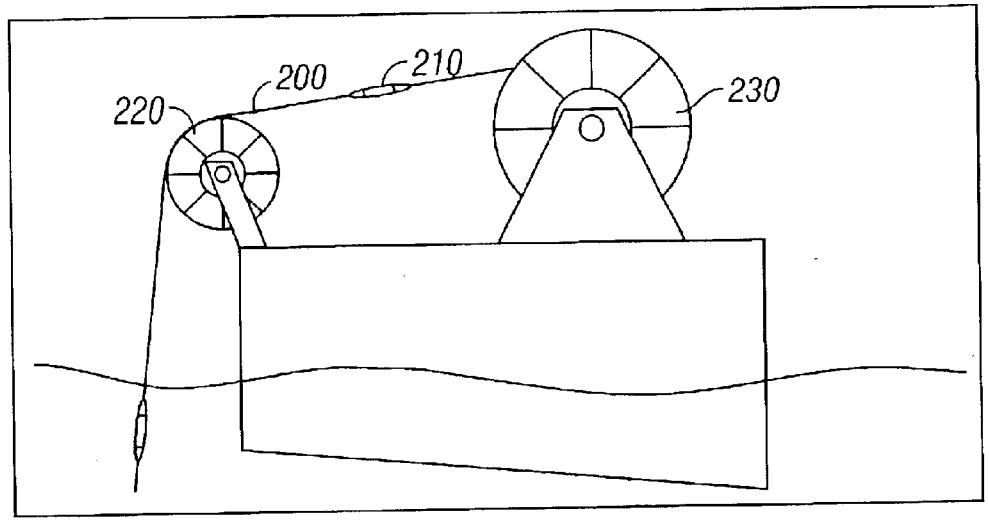
FIG. 3 illustrates a convention arrangement for handling a seabed cable.
Figure 4:
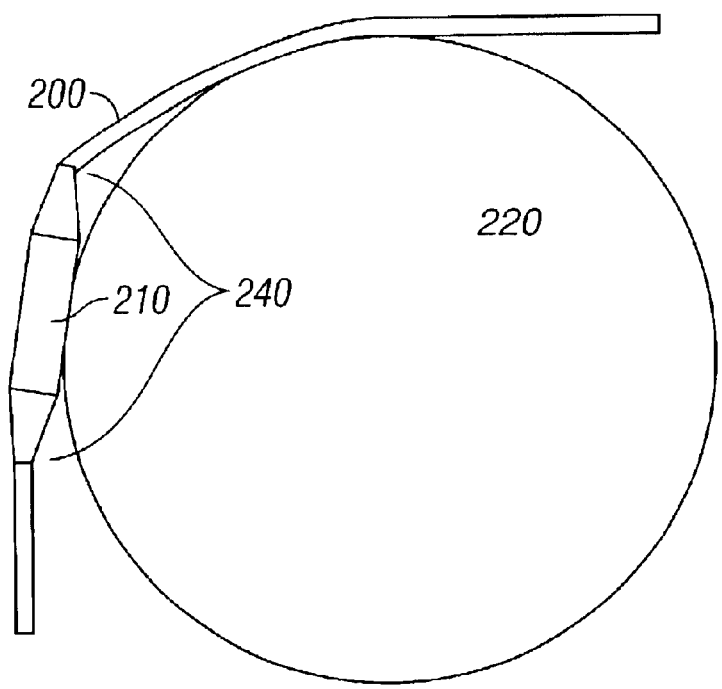
FIG. 4 illustrated a mode in which an exemplary conventional cable may be damaged during deployment.

Further, embodiments of cables made in accordance with the present invention will have advantages during handling; e.g., when the cable is deployed or retrieved form the seabed. Conventionally, winches and other machineries are used to pay out or pull in seismic cables. A typical arrangement for handling of a seabed cable is shown in FIG. 3. The cable 200 with the sensor module 210 pass over a sheave wheel 220 and onto a winch 230. As illustrated in FIG. 4, the cable 200 may be damaged in the point 240 when it is bent over a radius that is too small compared to the length of the relatively stiff sensor module 210. That is, the length of the stiff sensor module 210 does not properly seat on the arcuate surface of the sheave wheel 220. With conventional cables, a typical solution is to provide a very large diameter for the winch drums and sheave wheels, often in the range of 3 to 4 meters. Thus, the "stiff length" of a sensor module 210 can dictate the minimum diameter of a sheave wheel 220.

Figure 5:
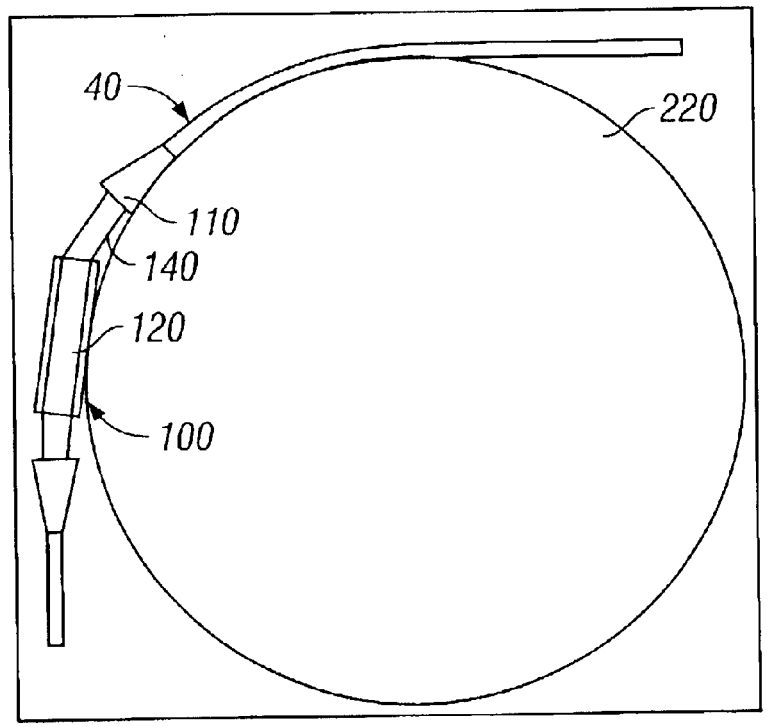
FIG. 5 illustrates how a cable made in accordance with one embodiment of the present invention accommodates small radiuses encountered during deployment.

Advantageously, a cable made in accordance with the present invention can reduce the minimum required diameter of a sheave wheel 220 because such a cable can have a stiff length in the range of 15 cm to 20 cm. Referring now to FIG. 5, a portion of a preferred cable 40 is shown disposed over a sheave wheel 220. As can be seen, the sensor module 100 flexes over the arcuate surface of the sheave wheel 220. Specifically, the decoupling device 140 allows a degree of articulation or flexibility between the sensor unit 120 and an end 46 of the cable 40. Depending on the geometry and materials of the sensor module 100, the stiff length will likely be the length of either the sensor unit 120 or a component of the decoupling device 140 rather entire sensor module 100. In addition to above-mentioned advantages the present invention will be significantly cheaper to manufacture then existing solutions.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A system for marine seismic exploration, comprising:
   (a) a first vessel for deploying a seismic source in a body of water, said source being adapted to emit acoustical energy;
   (b) a second vessel for deploying a cable having a plurality of segments and adapted to rest on a seabed;
   (c) one or more sensor units disposed along said cable, said one or more sensors being configured to detect reflected acoustical energy; and
   (d) a decoupling device associated with each said one or more sensor units, said decoupling device being substantially less rigid than said cable segments to substantially acoustically uncouple each said one or more sensor units from said cable.

2. The system according to claim 1 wherein said decoupling device substantially isolates said one or more sensors units from shear waves propagating through said cable.

3. The system according to claim 1 wherein said decoupling device is substantially less rigid than said cable.

4. The system according to claim 1, further comprising at least one fastening member for affixing said sensor unit to said at least one flexible tension member, said at least one fastening member being at least partially formed of a vibration absorbing material.

5. A system for marine seismic exploration, comprising:
   (a) a first vessel for deploying a seismic source in a body of water, said source being adapted to emit acoustical energy;
   (b) a second vessel for deploying a cable adapted to rest on a seabed;
   (c) one or more sensor units disposed along said cable, said one or more sensors being configured to detect reflected acoustical energy; and
   (d) a decoupling device associated with each said one or more sensor units, said decoupling device being configured to substantially acoustically uncouple each said one or more sensor units from said cable, wherein said decoupling device comprises at least one flexible tension member having opposing ends connected to said cable, said sensor unit being affixed to said at least one flexible tension member, further comprising at least one spacer affixed to said tension member, said at least one spacer adapted to selectively adjust the resonant frequency of said at least one tension member.

6. A system for marine seismic exploration, comprising:
   (a) a first vessel for deploying a seismic source in a body of water, said source being adapted to emit acoustical energy;
   (b) a second vessel for deploying a cable adapted to rest on a seabed;
   (c) one or more sensor units disposed along said cable, said one or more sensors being configured to detect reflected acoustical energy; and
   (d) a decoupling device associated with each said one or more sensor units, said decoupling device being configured to substantially acoustically uncouple each said one or more sensor units from said cable, further comprising at least one tube at least partially enclosing said decoupling device.

7. The system according to claim 1, further comprising at least one signal transmission carrier associated with said cable, said at least one signal transmission carrier being coupled to said sensor unit with a subsea connector.

8. The system according to claim 7 wherein said at least one signal transmission carrier transmits signals selected from a group consisting of electrical signals and optical signals.

9. The system according to claim 1 wherein said decoupling device substantially acoustically isolates said one or more sensor units from shear waves propagating along said cable.

10. The system according to claim 1 wherein said sensor unit includes a sensor selected from a group consisting of an acceleration sensor and a pressure wave sensor.

11. A system for marine seismic exploration, comprising:
    (a) a first vessel for deploying a seismic source in a body of water, said source being adapted to emit acoustical energy;
    (b) a second vessel for deploying a cable adapted to rest on a seabed;
    (c) one or more sensor units disposed along said cable, said one or more sensors being configured to detect reflected acoustical energy; and
    (d) a decoupling device associated with each said one or more sensor units, said decoupling device being configured to substantially acoustically uncouple each said one or more sensor units from said cable, wherein said sensor unit includes electronics circuitry for at least digitizing a signal output of a sensor associated with said sensor unit.

12. The system according to claim 1 wherein said first vessel and said second vessel are the same vessel.

13. A system for marine seismic exploration, comprising:
    (a) a first vessel for deploying a seismic source in a body of water, said source being adapted to emit acoustical energy;
    (b) a second vessel for deploying a cable adapted to rest on a seabed;
    (c) one or more sensor units disposed along said cable, said one or more sensors being configured to detect reflected acoustical energy; and
    (d) a decoupling device associated with each said one or more sensor units, said decoupling device being configured to substantially acoustically uncouple each said one or more sensor units from said cable, wherein said cable is tethered to a substantially stationary location selected from one of: (i) at least one buoy; and (ii) at least one platform.

14. The system according to claim 13 further comprising a seismic data recording system positioned at said substantially stationary location.

15. A method for performing marine seismic surveys, comprising:
    (a) positioning a sensor unit on a seabed such that the sensor unit is acoustically coupled to the seabed, the sensor unit being configured to detect reflected acoustical energy; and
    (b) connecting the sensor unit to a cable having segments with a decoupling device that substantially acoustically uncouples the sensor unit from the cable and wherein the decoupling device is substantially less rigid that the cable.

16. The method according to claim 15 wherein the decoupling device is substantially less rigid that the cable.

17. The method according to claim 15 further comprising substantially isolating the sensor unit from movement in the cable that is associated with acoustical energy.

18. The method according to claim 15 affixing the sensor unit to the decoupling device with a fastening member formed at least partially of vibration absorbing material member.

19. The method according to claim 15, further coupling at least one signal transmission carrier associated with said cable to the sensor unit with a subsea connector.

20. The method according to claim 19 further comprising configuring the at least one signal transmission carrier to transmit signals selected from a group consisting of electrical signals and optical signals.

21. The method according to claim 15 further comprising emitting acoustical energy into the body of water with an acoustical source; and detecting reflected acoustical energy with the sensor unit.

22. The method according to claim 21 further comprising transmitting data signals indicative of the detected reflected acoustical energy via at least one data transmission carrier to a surface vessel.

23. The method according to claim 22 further comprising processing the transmitted data signals.

24. A seismic cable, comprising:
a cable; and
at least one sensor unit for detection of reflected acoustical energy, said at least one sensor unit being attached to said cable with a decoupling device configured to acoustically decouple said at least one sensor unit from said cable, wherein said decoupling device includes at least one tension member and at least one termination block for connecting said at least one tension member to said cable.

25. The seismic cable according to claim 24 further comprising at least one fastening member connecting said at least one sensor unit to said at least one tension member.

26. The seismic cable according to claim 25 wherein said at least one fastening member is at least partially formed of a vibration absorbing material.

27. The seismic cable according to claim 25 wherein said cable comprises at least one data carrier electrically connected to said sensor unit by a subsea connector.

28. A seismic cable, comprising:
(a) a cable; and
(b) at least one sensor unit for detection of reflected acoustical energy, said at least one sensor unit being attached to said cable with a decoupling device configured to acoustically decouple said at least one sensor unit from said cable, wherein said decoupling device includes at least one tension member, wherein said cable comprises at least one data carrier electrically connected to said sensor unit by a subsea connector and at least a second data carrier bypassing said sensor unit.

29. A seismic cable, comprising:
(a) a cable; and
(b) at least one sensor unit for detection of reflected acoustical energy, said at least one sensor unit being attached to said cable with a decoupling device configured to acoustically decouple said at least one sensor unit from said cable, wherein said decoupling device includes at least one tension member; wherein a stiff length in said cable is no greater than about 20 cm.

30. The seismic cable according to claim 25 wherein said sensor unit includes at least one sensor configured to detect reflected acoustical energy in the form of one of pressure wave and shear waves.

31. The seismic cable according to claim 30 wherein said sensor unit includes a signal processor for processing signals produced by said at least one sensor.

32. The system according to claim 1 wherein said sensor unit includes at least one accelerometer.

33. The system according to claim 11 wherein said sensor unit includes at least one accelerometer.

34. The seismic cable according to claim 24 wherein the sensor unit includes at least one accelerometer.

35. A seismic cable, comprising:
(a) a cable;
(b) at least one sensor unit for detection of reflected acoustical energy, said at least one sensor unit being attached to said cable with a decoupling device configured to acoustically decouple said at least one sensor unit from said cable; and
(c) electronics circuitry for at least digitizing a signal output of a sensor associated with said at least one sensor unit.

36. The seismic cable according to claim 35 wherein said decoupling device includes at least one tension member.

37. The seismic cable according to claim 36 further comprising at least one termination block for connecting said at least one tension member to said cable.

38. The seismic cable according to claim 37 further comprising at least one fastening member connecting said at least one sensor unit to said at least one tension member.

39. The seismic cable according to claim 38 wherein said at least one fastening member is at least partially formed of a vibration absorbing material.

40. The seismic cable according to claim 35 wherein the sensor unit includes at least one accelerometer.

41. A method for performing marine seismic surveys, comprising:
(a) positioning a sensor unit on a seabed such that the sensor unit is acoustically coupled to the seabed, the sensor unit being configured to detect reflected acoustical energy;
(b) connecting the sensor unit to a cable with a decoupling device that substantially acoustically uncouples the sensor unit from the cable; and
(c) digitizing a signal output of a sensor associated with said sensor unit.

42. The method according to claim 41 further comprising tethering the cable to a substantially stationary location selected from one of: (i) at least one buoy; and (ii) at least one platform.

43. The method according to claim 41 further comprising positioning recording seismic data with a seismic data recording system positioned at the substantially stationary location.

44. The method according to claim 41 wherein the sensor unit includes at least one accelerometer.

* * * * *